(12) United States Patent
Yashiro

(10) Patent No.: US 7,243,261 B2
(45) Date of Patent: Jul. 10, 2007

(54) SUPPLY CONTROL APPARATUS AND POWER SUPPLY CONTROL METHOD

(75) Inventor: Kenji Yashiro, Tokyo (JP)

(73) Assignee: Pioneer Corporation, Tokyo (JP)

( * ) Notice: Subject to any disclaimer, the term of this patent is extended or adjusted under 35 U.S.C. 154(b) by 496 days.

(21) Appl. No.: 10/926,038

(22) Filed: Aug. 26, 2004

(65) Prior Publication Data
US 2005/0050388 A1    Mar. 3, 2005

(30) Foreign Application Priority Data
Aug. 27, 2003    (JP)    ............................ P2003-209159

(51) Int. Cl.
*G06F 11/00*    (2006.01)
(52) U.S. Cl. ...................................................... 714/14
(58) Field of Classification Search ................... 714/14, 714/340, 22
See application file for complete search history.

(56) References Cited

U.S. PATENT DOCUMENTS

| | | | | |
|---|---|---|---|---|
| 4,868,832 A | * | 9/1989 | Marrington et al. .......... 714/22 |
| 4,907,150 A | * | 3/1990 | Arroyo et al. ............... 713/323 |
| 5,283,905 A | * | 2/1994 | Saadeh et al. .............. 713/324 |
| 5,327,172 A | * | 7/1994 | Tan et al. ................... 348/378 |
| 5,410,713 A | * | 4/1995 | White et al. ................. 713/330 |
| 5,581,692 A | * | 12/1996 | Nevitt et al. ................. 714/12 |
| 6,202,171 B1 | * | 3/2001 | Townsley et al. ............. 714/14 |
| 6,691,248 B1 | * | 2/2004 | Nishijima et al. ............ 714/14 |
| 6,854,065 B2 | * | 2/2005 | Smith et al. ................ 713/300 |
| 6,888,472 B2 | * | 5/2005 | Yoshimura et al. .... 340/825.22 |
| 7,058,835 B1 | * | 6/2006 | Sullivan et al. ............. 713/324 |
| 7,131,011 B2 | * | 10/2006 | Westerinen et al. ......... 713/300 |

FOREIGN PATENT DOCUMENTS

| | | |
|---|---|---|
| JP | 5-80077 U | 10/1993 |
| JP | 2000-232730 A | 8/2000 |

* cited by examiner

*Primary Examiner*—Robert Beausoliel
*Assistant Examiner*—Amine Riad
(74) *Attorney, Agent, or Firm*—Sughrue Mion, PLLC

(57) ABSTRACT

In a power supply control apparatus for controlling turn-on/turn-off of power of a main power supply to a load via a switch section, a drive signal producing section produces a drive signal for controlling ON/OFF operations of the switch section, based on an activation signal output from an activating section. A standby power supply supplies operation power to the activating section 11 and the drive signal producing section. A power failure monitoring section produces an energization signal indicative of a result of monitoring of an output of the main power supply, and outputs the signal to the activating section. The activating section outputs the activation signal based on the energization signal.

14 Claims, 9 Drawing Sheets

SUPPLY CONTROL APPARATUS AND POWER SUPPLY CONTROL METHOD

BACKGROUND OF THE INVENTION

1. Field of the Invention

The present invention relates to a power supply control apparatus and a power supply control method, and more particularly to a power supply control apparatus which controls turn-on/turn-off of a main power supply, and a power supply control method for the same.

2. Description of the Related Art

Conventionally, in an audio-visual apparatus such as a television receiver or a VCR, or a power apparatus such as an air conditioning apparatus, turn-on/turn-off of the power supply (main power supply) is controlled by using a remote controller. Under such conditions, recently, many techniques for improving the energy consumption efficiency, or attaining energy saving have been proposed. As a technique for saving a wasted electric power in a standby period of a remote control signal, for example, a standby power supply circuit comprising switching means, controlling means (a relay coil), a microcomputer, a solar battery, and the like has been proposed (for example, JP-UM-A-5-80077). In the technique of Patent Reference 1, a circuit system including the controlling means, a remote control receiver, and the microcomputer is powered by electric energy converted by the solar battery.

In order to save electric energy, a power-saving apparatus in which standby power of an electronic circuit for receiving a signal from a remote controller is saved, and a power-saving battery circuit is operated by a solar battery has been proposed (for example, JP-A-2000-232730). In the technique of JP-A-2000-232730, in order to attain power saving, the solar battery, an electric double layer capacitor, a latching relay, and the like are used.

SUMMARY OF THE INVENTION

These conventional techniques have been proposed with the aim of power saving, and are not intended to cope with an unforeseen situation such as a power failure. On the other hand, the conventional techniques are directed only to a control by a remote controller, and not directed to a control by activating section such as a timer device. When both a remote controller and a timer device are used, consequently, there arises a problem in that, when an unforeseen situation such as a power failure occurs, an operation which is not expected by the user is conducted.

Specifically, a case where a commercial power supply is restored from a power failure will be considered. In the case where a load apparatus is operated by a remote controller, from the viewpoint of safety, a preferable state of a power supply of the load which is expected by the user is that, when the power supply is restored from a power failure, the power supply to the apparatus is turned OFF. By contrast, in the case where a load apparatus is operated by a timer device, the user previously knows the time when the load apparatus is to be turned ON/OFF, and recognizes that a power failure happens to occur during the timer operating period. Therefore, the user desires that, when the time of changing the power supply state of the apparatus arrives during a power failure, the expected power supply state is realized after the power supply is restored from the power failure.

In the conventional art, it is hard to say that the power supply control techniques can realize such an operation expected by the user.

The invention has been conducted in view of the situation discussed above. It is an object of the invention to provide a power supply control apparatus and a power supply control method which, even when both a remote controller operation and a timer operation are used, can realize an operation expected by the user.

According to one aspect of the invention, the power supply control apparatus is a power supply control apparatus for controlling turn-on/turn-off of power of a main power supply to a load via a switch section, wherein the apparatus comprises: an activating section which outputs an activation signal; a drive signal producing section which produces a drive signal for controlling ON/OFF operations of the switch section, based on the activation signal; a standby power supply which supplies operation power to the activating section and the drive signal producing section; and a power failure monitoring section which produces an energization signal indicative of a result of monitoring of an output of the main power supply, and which outputs the energization signal to the activating section, and the activating section outputs the activation signal based on the energization signal.

According to another aspect of the invention, the power supply control apparatus is a power supply control apparatus for controlling turn-on/turn-off of power of a main power supply to a load via a switch section, wherein the apparatus comprises: an activating section which outputs an activation signal; a drive signal producing section which produces a drive signal for controlling ON/OFF operations of the switch section, based on the activation signal; a standby power supply which supplies operation power to the activating section and the drive signal producing section; and a power failure monitoring section which produces an energization signal indicative of a result of monitoring of an output of the main power supply, and which outputs the energization signal to the activating section, and the drive signal producing section produces the drive signal based on the energization signal.

According to another aspect of the invention, the power supply control method is a power supply control method of controlling turn-on/turn-off of power of a main power supply to a load, by means of a control on a switch section based on an activation signal output from an activating section, the activating section comprising a timer device and a remote control receiver, wherein the method comprises: a first timer setting effectiveness judging step of judging whether timer setting is effective or not; a main power supply output judging step of, if it is judged in the first timer setting effectiveness judging step that the timer setting is not effective, judging whether an output of the main power supply exists or not; and a first remote controller operation judging step of, if it is judged in the main power supply output judging step that the output of the main power supply exists, judging whether an ON operation is conducted through the remote control receiver or not, and, when the activation signal is output based on the first remote controller operation judging step, the switch section is set to an ON state.

DESCRIPTION OF THE PREFERRED EMBODIMENTS

Hereinafter, embodiments and examples of the power supply control apparatus and the power supply control method of the invention will be described in detail with reference to the accompanying drawings. The invention is not restricted by the embodiments.

Figure 1:
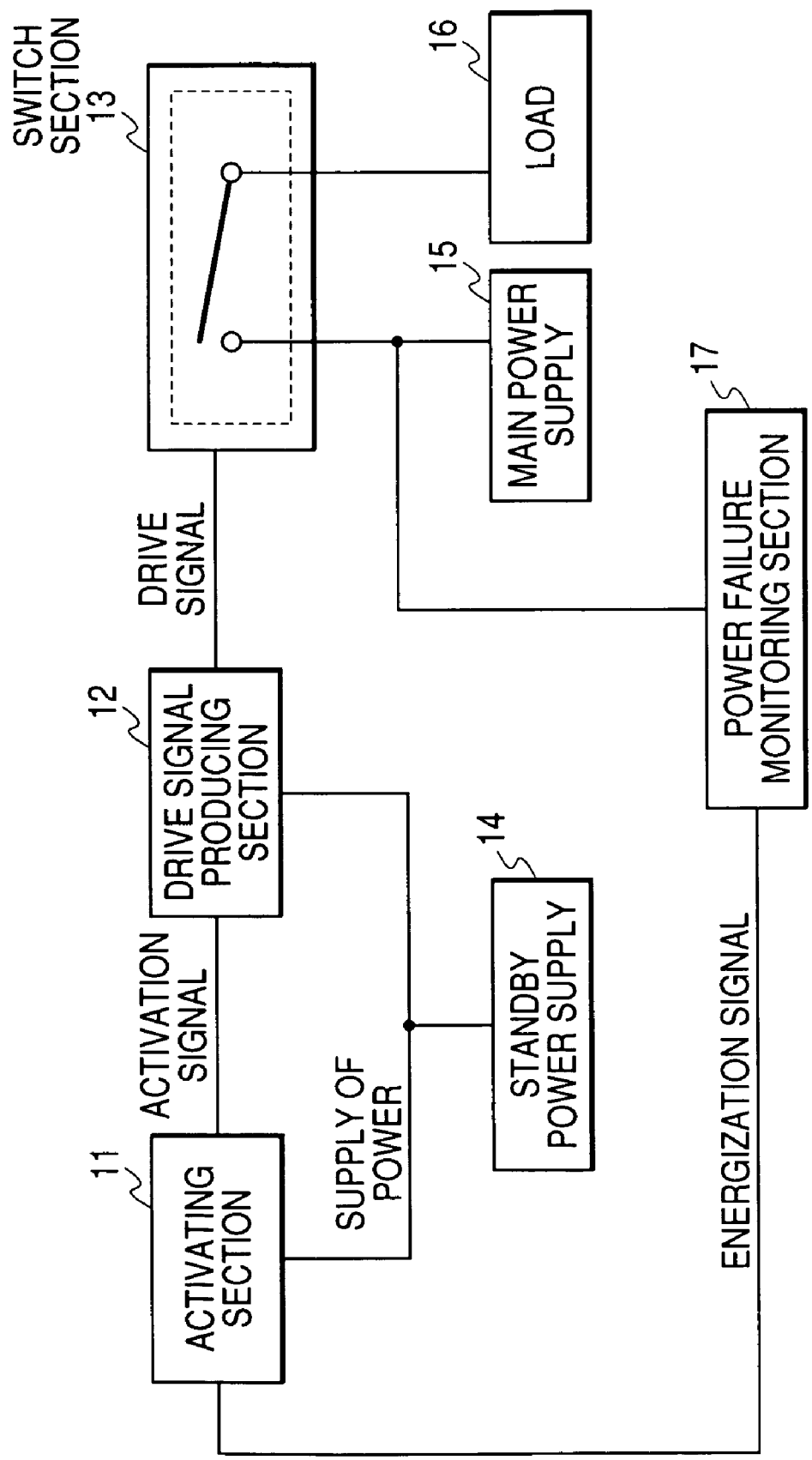
FIG. 1 is a block diagram showing the configuration of an embodiment of the power supply control apparatus of the invention.

FIG. 1 is a block diagram showing the configuration of an embodiment of the power supply control apparatus of the invention. As shown in the figure, the power supply control apparatus comprises an activating section 11, a drive signal producing section 12, a standby power supply 14, a switch section 13, and a power failure monitoring section 17. The apparatus controls the switch section 13 at a desired timing so that an electric power of a main power supply 15 is supplied to a load 16.

Next, the operation of the power supply control apparatus of the embodiment will be described with reference to FIG. 1. Referring to the figure, the power of the standby power supply 14 is supplied to the activating section 11 and the drive signal producing section 12. As the standby power supply 14, useful is a primary battery such as a dry battery, or a secondary battery such as a storage battery. The power failure monitoring section 17 monitors an output of the main power supply 15 which is, for example, a commercial power supply or a load power supply circuit inside an apparatus, and outputs to the activating section 11 an energization signal indicative of a judgment whether the main power supply 15 effectively operates or not. The activating section 11 comprises, for example, a timer device and a remote control receiver, produces an activation signal based on the energization signal output from the power failure monitoring section 17, and outputs the activation signal to the drive signal producing section 12. The drive signal producing section 12 produces a drive signal for setting a switch of the switch section 13 to an OFF state or an ON state, and outputs the drive signal to the switch section 13. The switch section 13 conducts operations of supplying and interrupting the power of the main power supply 15 to the load.

As the switch section 13, a self-holding relay is preferably used. A self-holding relay can be subjected to an intermittent power supply in which a driving circuit of the relay is energized only at a moment when the state of the main power supply 15 is inverted (from energization to interruption, or from interruption to energization). In this case, the drive signal producing section 12 is required only to produce a driving output for making (setting to the ON state)/breaking (setting to the OFF state) a relay contact of the self-holding relay, and hence the power consumption can be reduced. Alternatively, the switch section 13 maybe configured as, in place of a self-holding relay, a self-holding switching circuit in which circuit elements that can operate at low power are used.

In the above description, the activating section 11 produces the activation signal based on the energization signal output from the power failure monitoring section 17. More correctly, the operation of outputting the activation signal from the timer device is conduced in a different manner from that of outputting the activation signal from the remote control receiver. These operations will be described later.

The embodiment is configured so that the energization signal which is an output of the power failure monitoring section 17 is output to the activating section 11. Alternatively, the energization signal may be output to the drive signal producing section 12. In the alternative, the drive signal producing section 12 receives the activation signal from the activating section 11, and operates so as to produce a drive signal for controlling the switch section 13, based on the energization signal from the power failure monitoring section 17 and at a desired timing.

As described above, the power supply control apparatus of the embodiment is a power supply control apparatus for controlling turn-on/turn-off of power of the main power supply to the load via the switch section, and comprises: the power failure monitoring section which produces and outputs the energization signal indicative of a result of monitoring of the output of the main power supply; the activating section which outputs the activation signal based on the energization signal output from the power failure monitoring section; the drive signal producing section which produces the drive signal for controlling ON/OFF operations of the switch section, based on the activation signal; and the standby power supply which supplies the operation power to the activating section and the drive signal producing section. Therefore, it is required only to produce the driving output for making/breaking the relay contact of the switch section, and hence the power consumption can be reduced.

Figure 2:
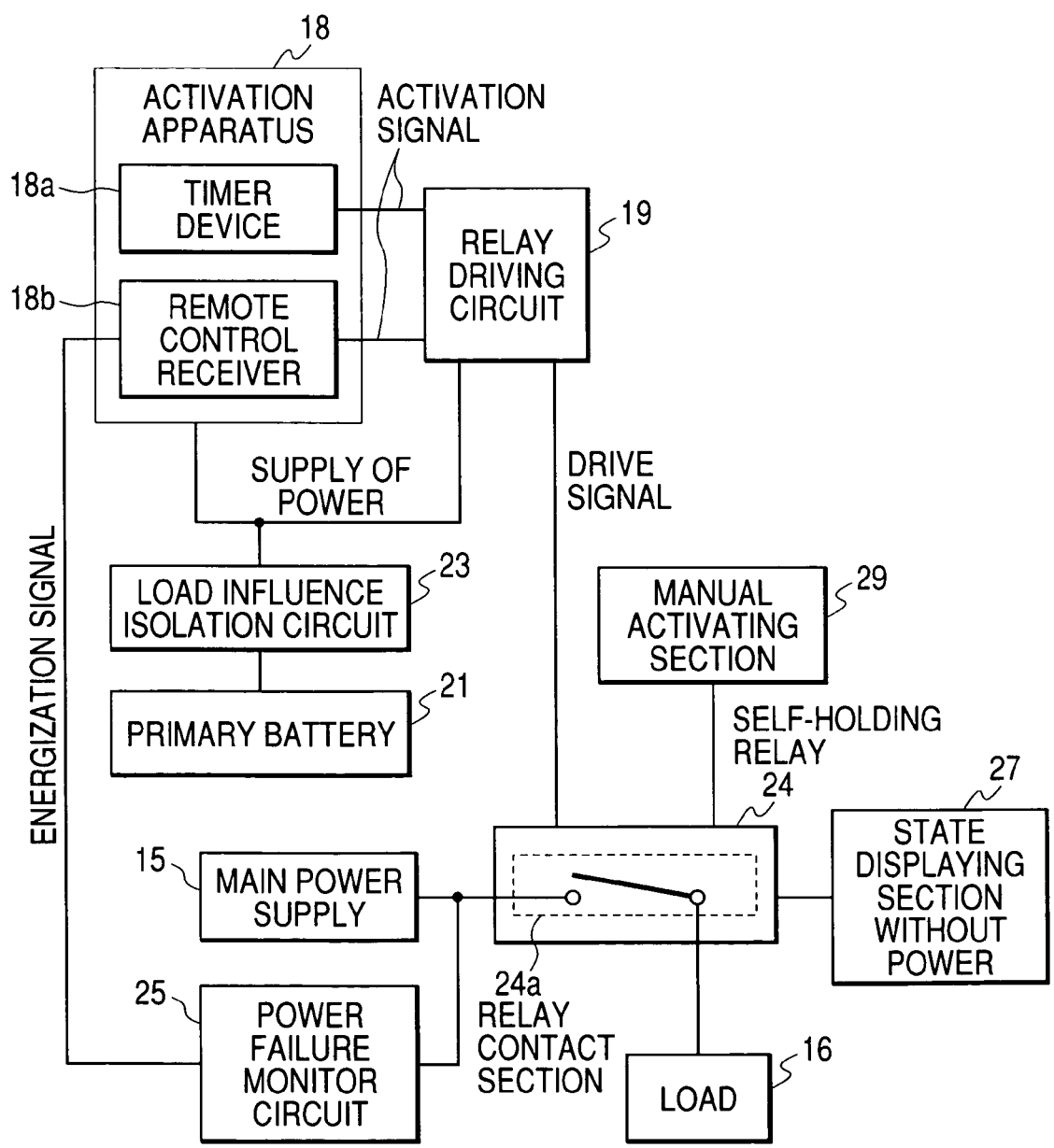
FIG. 2 is a block diagram showing the configuration of a specific example (Example 1) in which the power supply control apparatus of the invention is applied to a lighting apparatus for a fluorescent lamp.

FIG. 2 is a block diagram showing the configuration of a specific example (Example 1) in which the power supply control apparatus of the invention is applied to a lighting apparatus for a fluorescent lamp. The example is used for turning ON/OFF a street lamp at different times in accordance with the day of the week. Hereinafter, the configuration and operation of the example will be described with reference to FIG. 2.

First, the configuration of the example will be described. Referring to FIG. 2, an activation apparatus 18 comprises a timer device 18a and a remote control receiver 18b. The timer device 18a and the remote control receiver 18b are connected to a relay driving circuit 19. A primary battery 21 such as a dry battery is connected to the activation apparatus 18 and the relay driving circuit 19 through a load influence isolation circuit 23. A power failure monitor circuit 25 which monitors the output of the main power supply 15 such as a commercial power supply is connected to the remote control receiver 18b in the activation apparatus 18. An output of the relay driving circuit 19 is connected to a self-holding relay 24 comprising a relay contact section 24a through which the main power supply 15 and the load 16 that is a fluorescent lamp lighting apparatus are connected to each other. A state displaying section without power 27 which is used for visually checking whether the relay contact section 24a is in the break state or the make state, and a manual activating section 29 which, when the drive signal is not output, compulsively sets the relay contact section 24a to the make state are connected to the self-holding relay 24.

Next, the operation of the example will be described. Referring to FIG. 2, the power of the primary battery 21 is supplied to the activation apparatus 18 and the relay driving circuit 19 via the load influence isolation circuit 23. The load influence isolation circuit 23 is an isolator circuit configured by a transistor, a diode, a capacitor, and the like, and is disposed in order to prevent the output voltage of the primary battery 21 from momentarily dropping when a drive current flows in response to the drive signal output from the relay driving circuit 19. The disposition of the load influence isolation circuit 23 can stabilize the operation of the timer device 18a.

In accordance with information (for example, turning ON/OFF times, the day of the week, and the season) for turning ON/OFF the street lamp, the timer device 18a of the activation apparatus 18 produces the activation signal, and outputs the signal to the relay driving circuit 19. In the case of rain, for example, the street lamp is sometimes requested to be compulsively turned ON at an early time. In such a case, the activation signal is output also from the remote control receiver 18b of the activation apparatus 18 by remote control operation. When the remote control receiver 18b receives the ON signal and, at the reception of the ON signal, the energization signal is output from the power failure monitor circuit 25, the remote control receiver 18b outputs the activation signal. The reason of this will be described later.

Based on the activation signal output from the timer device 18a or the remote control receiver 18b, the relay driving circuit 19 outputs the drive signal to the self-holding relay 24. In the self-holding relay 24 to which the drive signal is supplied, the relay contact section 24a is controlled to enter the make state or the break state so that the power from the main power supply 15 is supplied or interrupted.

The manual activating section 29 is activating means for, when the drive signal is not output, compulsively setting the relay contact section 24a to the make state. Even in the case where the output of the primary battery 21 is lost or lowered, for example, the relay is sometimes requested to be set to the make state. Also in such a case, the relay can be instantly set by a manual operation to the make state, so that the power of the main power supply 15 can be supplied to the load 16.

In a usual self-holding relay, it is impossible to check whether the relay contact is in the make state or in the break state. In a case where a large power is to be controlled, or where both a timer device and a remote controller are used, particularly, it is often required to know whether the state of the relay contact at a certain timing is the make state or the break state. The state displaying section without power 27 shown in FIG. 2 can realize this function without consuming power, and will be described later in detail.

In FIG. 2, the load shown is a fluorescent lamp. When the fluorescent lamp is turned OFF, therefore, large voltage noises of several tens to several hundreds of volts are generated. Such voltage noises are generated in the relay contact, and may function as noises which disturb the stable operation of the timer device that operates at a voltage of several volts. In the case where the relay driving circuit 19 cannot be isolated from the self-holding relay 24, the operation may be affected by the noises. In such a case, an opening/closing noise isolation circuit formed by a capacitor, a coil, and the like is connected between the relay driving circuit 19 and the self-holding relay 24, whereby influences of noises generated in the relay contact can be reduced. A countermeasure other than circuit means may be taken. For example, a printed circuit board on which the activation apparatus 18 and the relay driving circuit 19 are mounted, and that on which the self-holding relay 24 is mounted are mechanically separated from each other, and measures such as an electromagnetic shield or an electrostatic shield are taken, whereby influences of such noises can be suppressed.

In Example 1 of FIG. 2, the self-holding relay 24 is used as the switch section 13 in FIG. 1. The self-holding relay 24 executes the opening/closing control on the main power supply 15 under the intermittent power supply in which the self-holding relay 24 is energized only at a moment when the state of the main power supply 15 is inverted. Because of the intermittent power supply, in the case where the state of the main power supply 15 is transferred, the relay drive current can be completed within a short time period of energization. Therefore, the power for driving the relay which is output from The relay driving circuit 19 can be realized by a power of a very low level. Unlike a conventional power supply control apparatus, consequently, it is not required to use a voltage converting device (transformer) which steps down the output voltage of the main power supply, and voltage stabilizing devices which stabilize the stepped-down voltage, such as a resistor and a capacitor. Furthermore, the output of the primary battery such as a dry battery can be used directly or without conducting voltage conversion. Since a voltage converting device, voltage stabilizing devices, and the like which are used in a conventional apparatus are not necessary, it is possible to eliminate wasteful indirect power consumption which is caused in a configuration where such devices always operate.

Usually, the power supply voltage which is requested for driving the self-holding relay 24 is different from the voltage which is requested by the activation apparatus 18. Furthermore, the voltage which is applied to the relay coil of the relay contact section 24a of the self-holding relay 24 is usually higher than that which is requested by the activating section 11. In such a case, a configuration may be employed in which the relay drive voltage is converted (DC-DC converted) by the relay driving circuit 19, and the converted voltage is applied to the self-holding relay 24. In the DC-DC conversion, indirect power consumption is caused by the voltage conversion. However, the time period when the DC-DC converting function operates is limited to a very short time period of several tens of milliseconds for switching over (transferring) the supply/interruption state of the power of the main power supply 15 to the load 16. Therefore, the relay operation can be conducted by power consumption of a very small degree.

Figure 3:
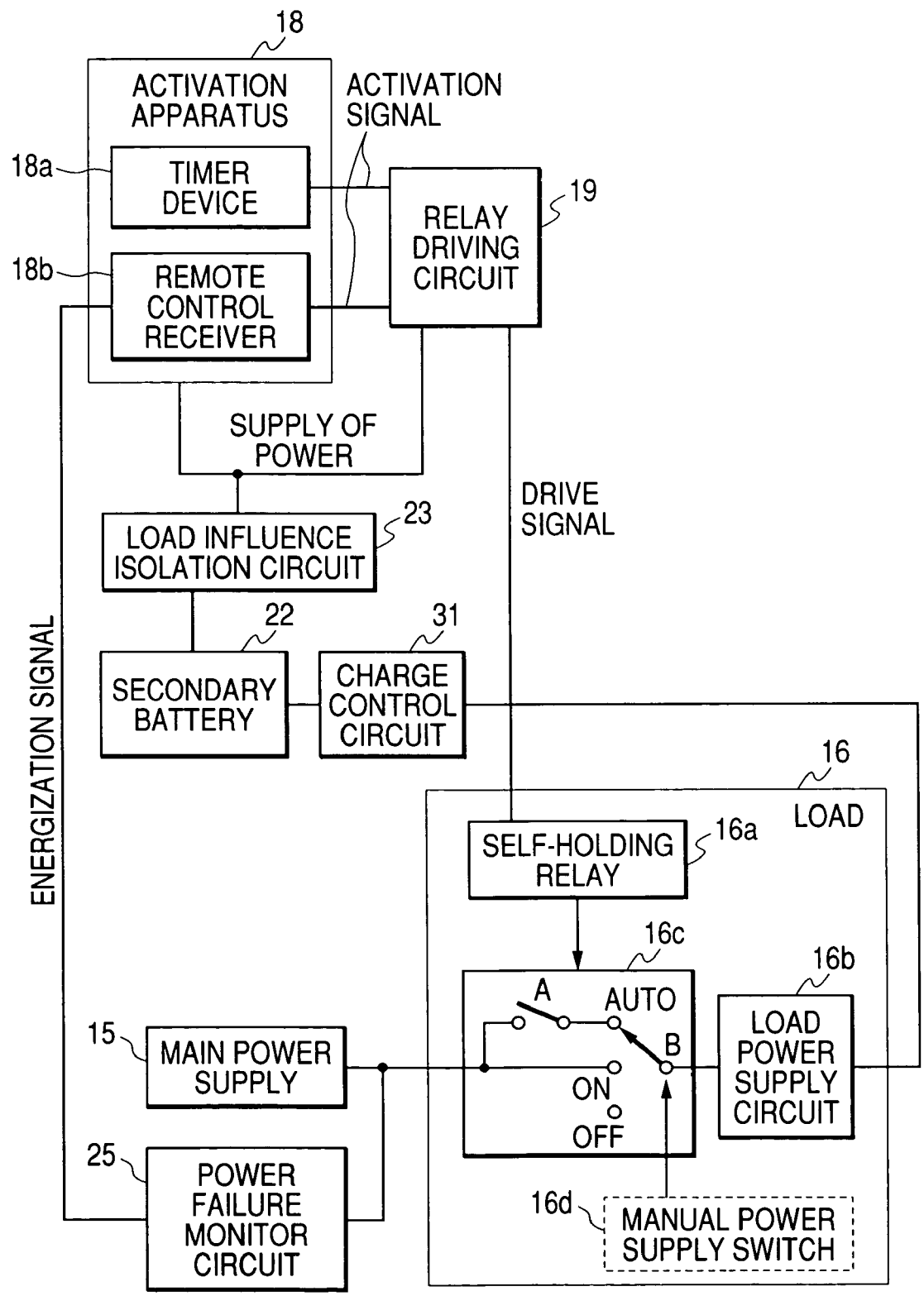
FIG. 3 is a block diagram showing the configuration of another specific example (Example 2) in which the power supply control apparatus of the invention is applied to a power supply control in an audio apparatus.

FIG. 3 is a block diagram showing the configuration of another specific example (Example 2) in which the power supply control apparatus of the invention is applied to a power supply control in an audio apparatus. In Example 2, unlike Example 1, the number of ON/OFF operations is not definitely set. In consideration of the use conditions, therefore, the standby power supply 14 in FIG. 1 is configured by a secondary battery, and, during the ON period of the main power supply, the secondary battery is charged via a charge control circuit.

First, the configuration of the example will be described. Referring to FIG. 3, an activation apparatus 18 comprises a timer device 18a and a remote control receiver 18b. The timer device 18a and the remote control receiver 18b are connected to a relay driving circuit 19. The secondary battery 22 which is connected to the charge control circuit 31 is connected to the activation apparatus 18 and the relay driving circuit 19 through a load influence isolation circuit 23. A power failure monitor circuit 25 which monitors the output of the main power supply 15 is connected to the remote control receiver 18b in the activation apparatus 18. An output of the relay driving circuit 19 is connected to a self-holding relay 16a disposed in the load 16 which is an audio apparatus. By contrast, a load power supply circuit 16b disposed in the load 16 is connected to the charge control circuit 31 which controls an operation of charging the secondary battery 22. A relay contact section 16c disposed in the load 16 has a switch A section which is driven by the self-holding relay 16a, and a switch B section in which three positions of "OFF", "ON", and "AUTO" are switched over by a manual power supply switch 16d. The main power supply 15 and the load power supply circuit 16b are connected to each other via there lay contact section 16c. The manual power supply switch 16d is disposed in order to always connect the main power supply 15 with the load power supply circuit 16b when the drive signal from the relay driving circuit 19 is not output because of a lowered output level of the secondary battery 22, and the self-holding relay 16a cannot function, or to always disconnect the main power supply 15 from the load power supply circuit 16b.

As described above, in the circuit of the example, the standby power supply comprises the secondary battery 22 and the charge control circuit 31 in view of the indefinite number of ON/OFF operations of the self-holding relay. Except this configuration difference, the basic configuration of the example is identical with that of Example 1, and therefore detailed description of the operation is omitted.

In the example, in the same manner as Example 1, the self-holding relay 16a is used. Therefore, the power for driving the relay which is output from the relay driving circuit 19 can be set to a power of a very low level. In order to further stabilize the relay operation, in the same manner as Example 1, a configuration may be employed in which the relay drive voltage is converted (DC-DC converted) by the relay driving circuit 19, and the converted relay drive voltage is applied to the self-holding relay 16a. Also in this case, the time period when the DC-DC converting function operates is limited to a very short time period of several tens of milliseconds during which the relay contact section 16c operates. Therefore, the relay operation can be conducted by power consumption of a very small degree.

In the case where voltage noises generated by the relay contact section become problematic, in the same manner as Example 1, an opening/closing noise isolation circuit formed by a capacitor, a coil, and the like may be connected between the relay driving circuit 19 and the self-holding relay 16a, or measures such as an electromagnetic shield or an electrostatic shield may be taken.

Figure 4:
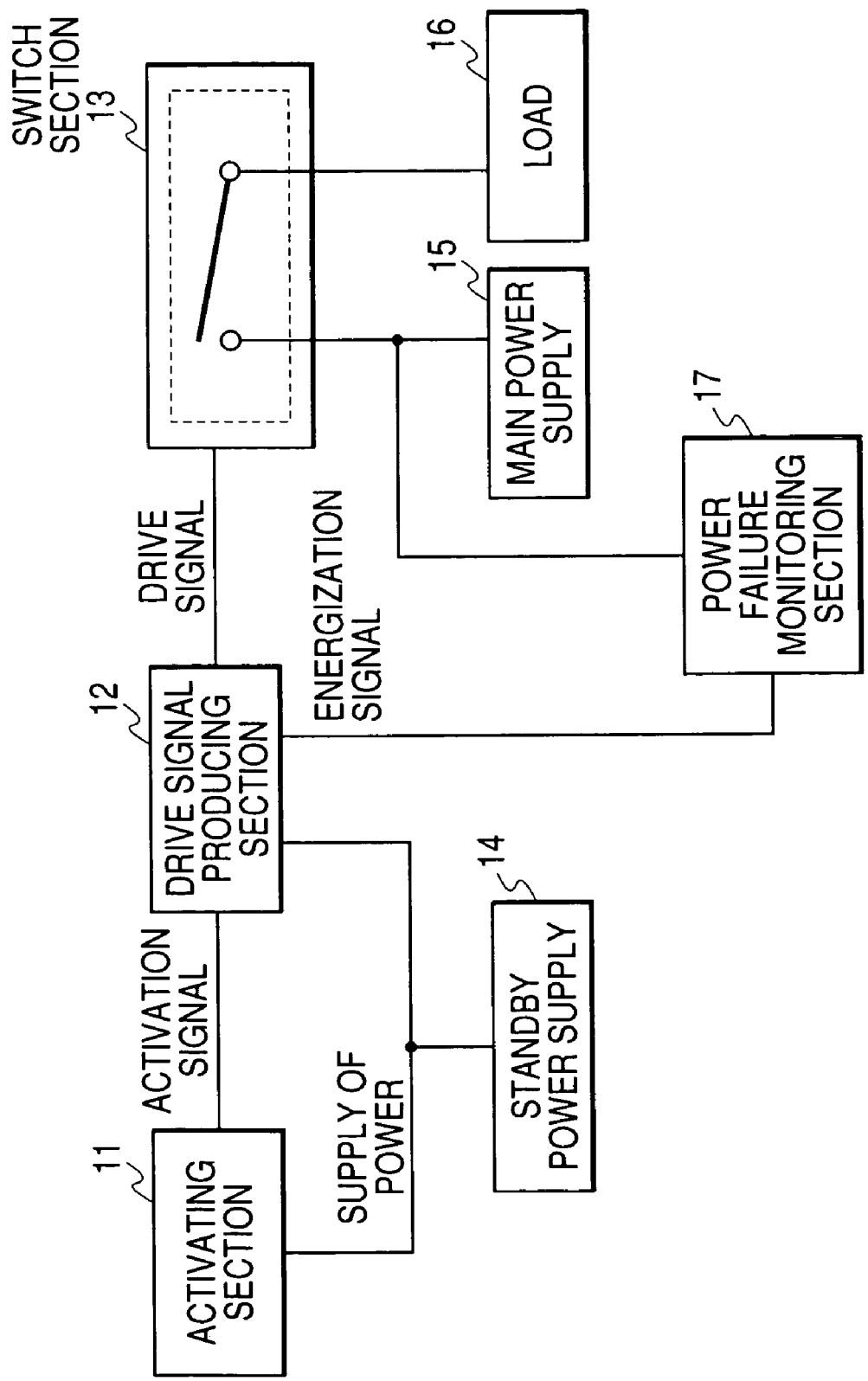
FIG. 4 is a block diagram showing a modification of the embodiment shown in FIG. 1.

FIG. 4 is a block diagram showing a modification of the embodiment shown in FIG. 1. In the embodiment shown in FIG. 1, the output (energization signal) of the power failure monitoring 17 is supplied to the activating section 11. In this case, as shown in Examples 1 and 2, the energization signal is output to the remote control receiver 18b of the activating section 11, and a logic circuit (judging means) in the remote control receiver 18b performs a judgment process based on the presence or absence of the energization signal. In this case, the relay driving circuit 19 in FIG. 2 or 3 does not require judging means using a logic circuit, and can be configured as a simple circuit for driving the self-holding relay 24 or 16a.

By contrast, in the embodiment shown in FIG. 4, the energization signal is output to the drive signal producing section 12. In this case, the judgment process based on the presence or absence of the energization signal is performed by a logic circuit in the drive signal producing section 12, or the like. Furthermore, in this case, it is not required to incorporate a logic circuit into the remote control receiver 18b in FIG. 2 or 3, and a logic circuit can be incorporated into the relay driving circuit 19.

As described above, the power supply control apparatus of the embodiment is a power supply control apparatus for controlling turn-on/turn-off of power of the main power supply to the load, via the switch section, and comprises: the power failure monitoring section which produces and outputs the energization signal indicative of a result of monitoring of the output of the main power supply; the activating section which outputs the activation signal; the drive signal producing section which produces the drive signal for controlling ON/OFF operations of the switch section by using the activation signal based on the energization signal that is output from the power failure monitoring section; and the standby power supply which supplies the operation power to the activating section and the drive signal producing section. Therefore, it is required only to produce the driving output for making/breaking the relay contact of the switch section, and hence the power consumption can be reduced.

Figure 5:
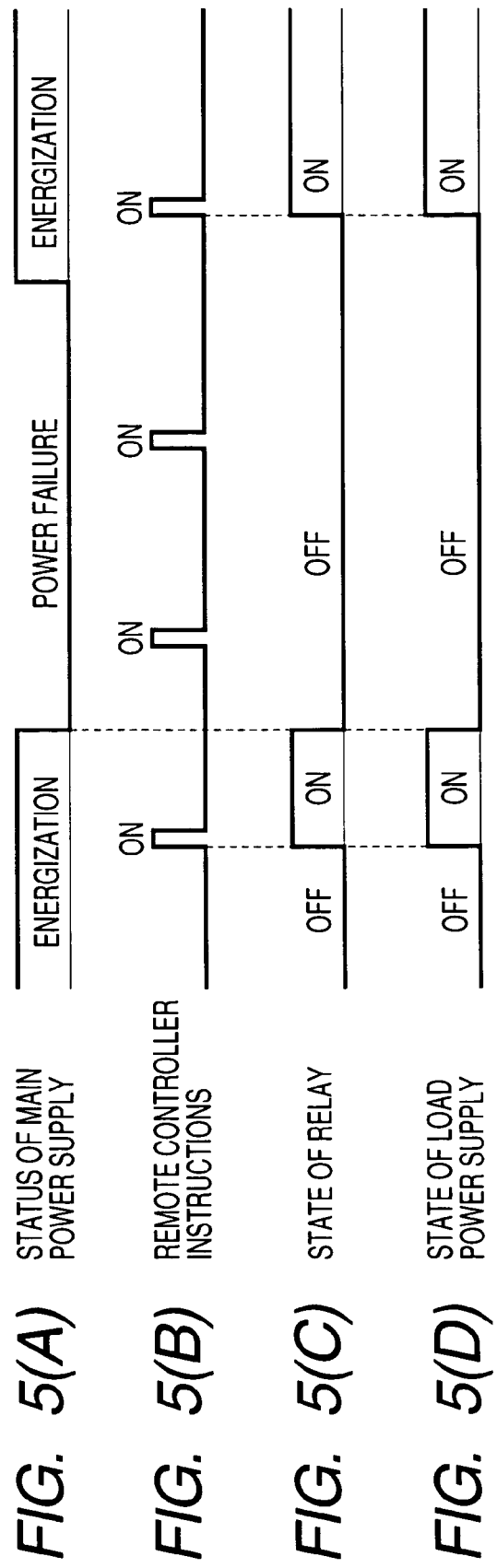
FIG. 5 is a time chart showing states of a relay and a load power supply in response to a remote controller operation during a power failure.
Figure 6:
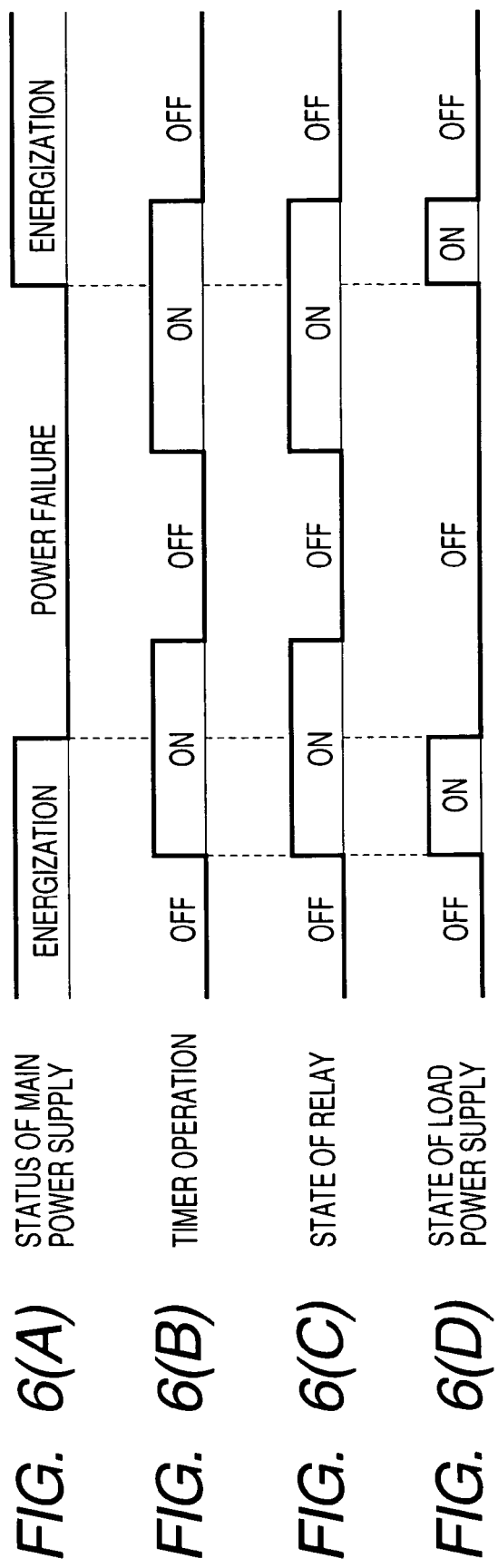
FIG. 6 is a time chart showing states of the relay and the load power supply in response to a timer operation during a power failure.

FIG. 5 is a time chart showing states of the relay and the load power supply in response to a remote control operation during a power failure, and FIG. 6 is a time chart showing states of the relay and the load power supply in response to a timer operation during a power failure. These time charts illustrate operation states of, for example, Example 2 shown in FIG. 3 in the case where the power of the main power supply 15 is supplied to the load power supply circuit 16b. Specifically, (A) of FIGS. 5 and 6 show the normal state (energization) or the power failure state (power failure) of the main power supply, (B) of FIG. 5 shows an output signal of remote controller instructions, (B) of FIG. 6 shows an output signal of the timer operation. In FIGS. 5 and 6, (C) shows the state of the relay (make: ON, break: OFF), and (D) shows the state of the load power supply.

In the time charts of FIGS. 5 and 6, the state of the relay (load power supply state) caused by remote controller instructions is different from that of the relay (load power supply state) caused by the timer operation. The reason of this is that the user expects different load power supply states which are to be realized when the main power supply is restored from a power failure. In the case of the remote controller operation, from the viewpoints of safety and the like, the user expects the load power supply state when the main power supply is restored from a power failure, to be a state where the power is turned OFF. By contrast, in the case of the timer operation, the user previously knows the time when the load is to be turned ON/OFF, and recognizes that a power failure happens to occur during the timer operating period. Therefore, the user desires that, when an operation of changing the power supply state of the load is conducted during a power failure, the expected state is realized after the power supply is restored from the power failure.

In the time charts of FIGS. 5 and 6, the apparatus operates so as to attain the states which are expected by the user. In FIG. 5, in the case where the supply status of the main power is in the energization state, when the ON signal is output by remote controller instructions, the relay is set to the ON state, and the load power supply is set to the ON state. In the case where the supply status of the main power is in the power failure state, even when the ON signal is output by remote controller instructions, the relay is not set to the ON state, and the load power supply is set to the OFF state. By contrast, in FIG. 6, when a timer operation signal is output, the relay is set to the ON state irrespective of whether the supply status of the main power is in the energization state or in the power failure state. In this case, as shown in (D) of FIG. 6, when a power failure occurs, the power is not supplied, and hence the load power supply is in the OFF state. When the power supply is restored from the power failure, the load power supply can be set to the ON state because the relay is in the ON state.

Figure 7:
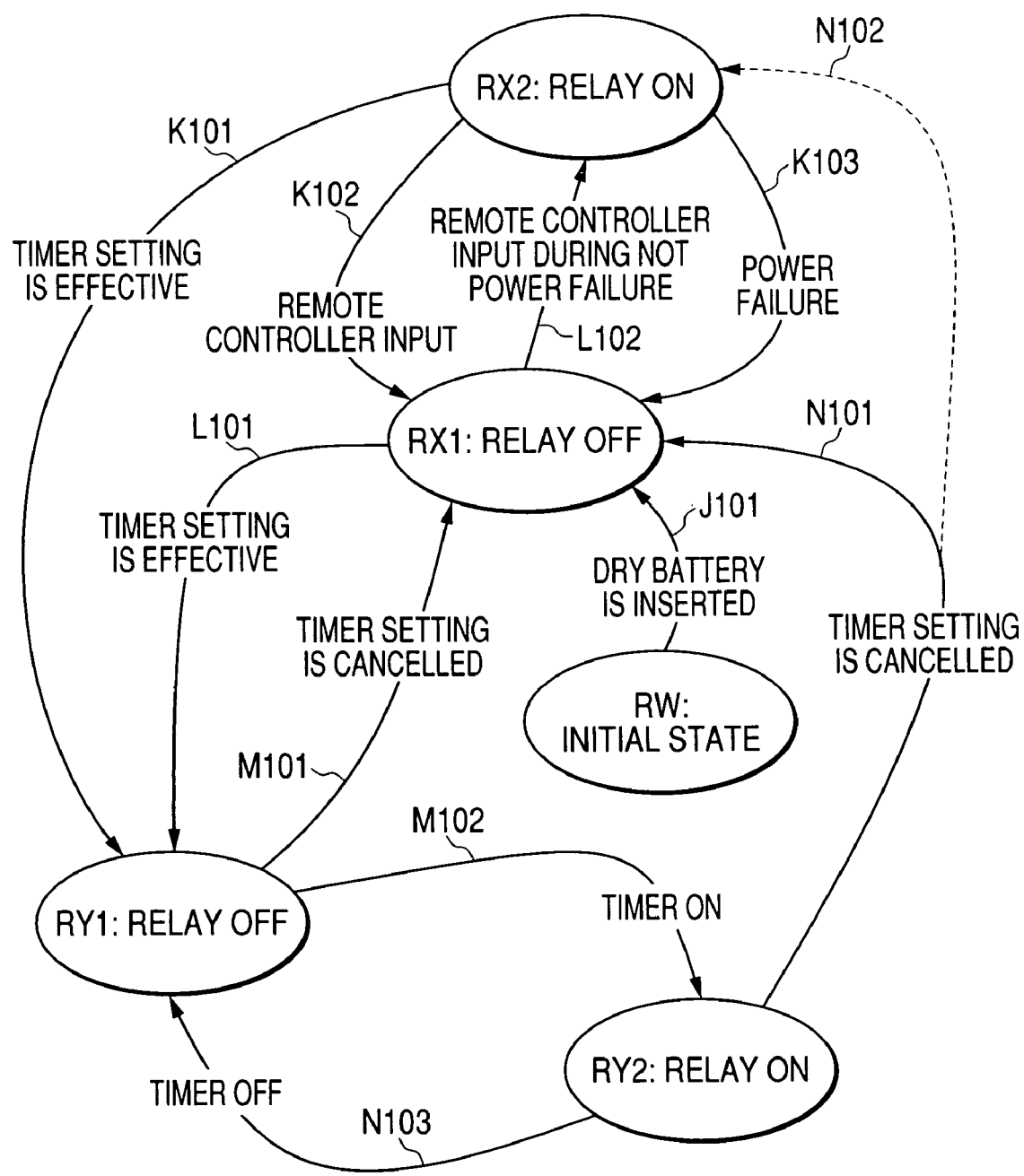
FIG. 7 is a state transition diagram in the case where both a remote controller and a timer device are used.

FIG. 7 is a state transition diagram in the case where both the remote controller and the timer device are used. In the figure, RW shows the initial state, RX1 shows a state where the timer setting is ineffective and the relay is in the OFF state, and RX2 shows a state where the timer setting is ineffective and the relay is in the ON state. Similarly, RY1 shows a state where the timer setting is effective and the relay is in the OFF state, and RY2 shows a state where the timer setting is effective and the relay is in the ON state.

The flows of state transitions in the case where both the remote controller and the timer device are used will be described with reference to FIG. 7. Each state transition is judged by the logic circuit (judging means) in the activating section 11 in FIG. 1 (or the remote control receiver 18b in FIG. 2 or 3), or by the logic circuit (judging means) in the drive signal producing section 12 in FIG. 4.

Referring to FIG. 7, when a dry battery is inserted in the initial state (RW) (the standby power supply is effective), the state transits to "RX1 (relay OFF)" (transition J101). When the timer setting is made effective in "RX1 (relay OFF)", the state transits to "RY1 (relay OFF)" (transition L101). By contrast, when a remote controller input is given and the remote controller input is conducted when the power failure state is not set, the state transits to "RX2 (relay ON)" (transition L102).

When, in "RX2 (relay ON)", a remote controller input is given or the main power supply fails, the state transits to "RX1 (relay OFF)" (transition K102 or K103). When the timer setting is made effective in "RX2 (relay ON)", the state transits to "RY1 (relay OFF)" (transition K101).

When the timer setting is made ineffective in "RY1 (relay OFF)", the state transits to "RX1 (relay OFF)" (transition M101). By contrast, when a prejudged time reaches and the timer device is turned ON (timer ON), the state transits to "RY2 (relay ON)" (transition M102). When a prejudged time passes and the timer device is turned OFF (timer OFF) in "RY2 (relay ON)", the state transits to "RY1 (relay OFF)" (transition N103). By contrast, when the timer setting is made ineffective, the state transits to one of "RX1 (relay OFF)" and "RX2 (relay ON)" (transition N101 or N102). In FIG. 7, transition N102 is indicated by a broken line. The broken line means that the transition is a design item. Depending on the design specification, one of transition N101 and transition N102 is conducted.

Figure 8:
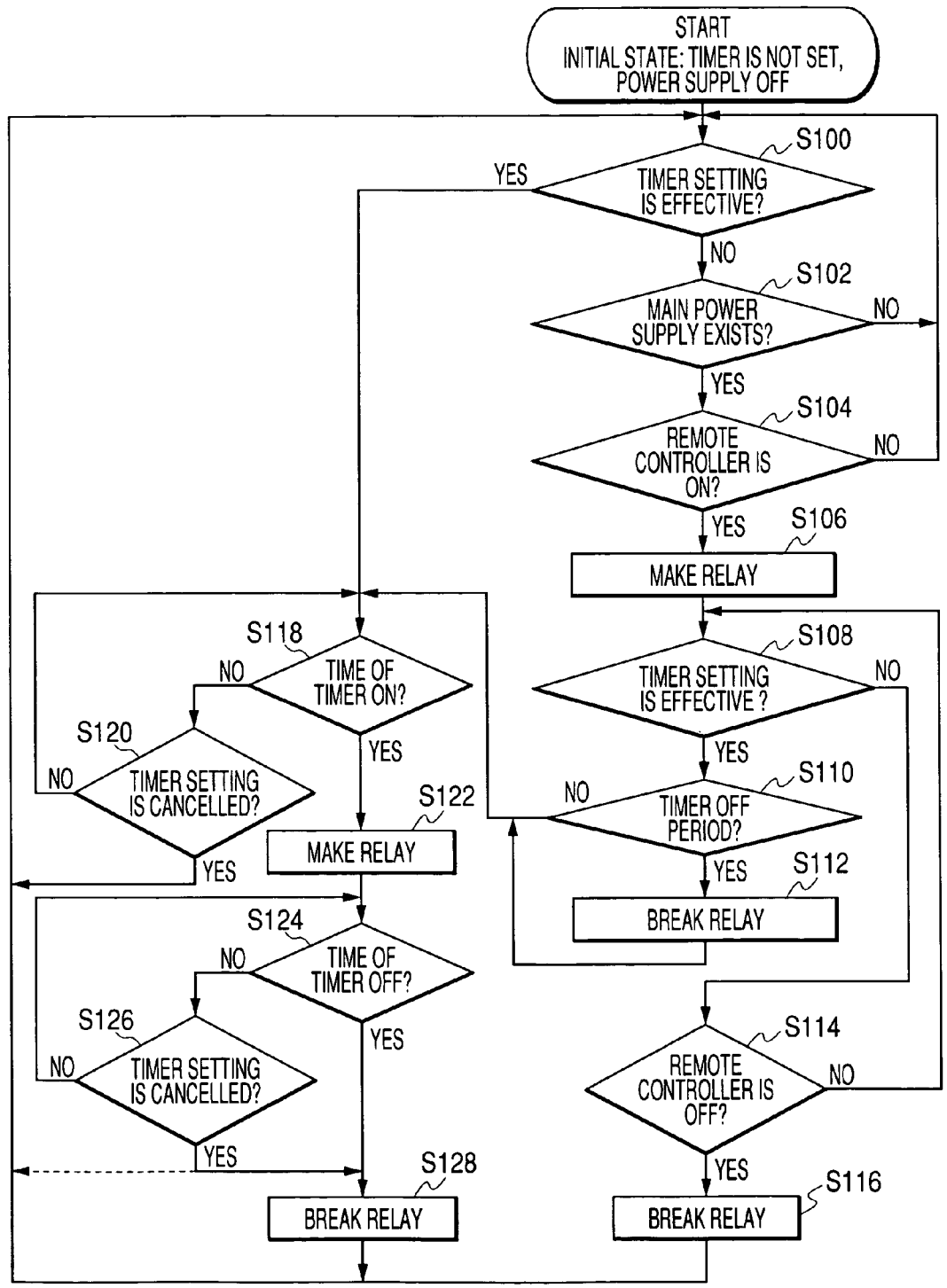
FIG. 8 is a flowchart showing a method of controlling a relay in the power supply control apparatus of the embodiment of the invention.

FIG. 8 is a flowchart showing a method of controlling the relay in the power supply control apparatus of the embodiment of the invention. The steps shown in the flowchart are conducted by the logic circuit (judging means) in the activating section 11 in FIG. 1 (or the remote control receiver 18b in FIG. 2 or 3), or by the logic circuit (judging means) in the drive signal producing section 12 in FIG. 4. Hereinafter, the steps of FIG. 8 will be described in detail.

Referring to FIG. 8, in the initial state, the timer device is not set, and the main power supply is in the OFF state. In the initial state, it is judged whether the timer setting is effective or not (step S100). If the timer setting is not effective (step S100: No), it is judged whether the output of the main power supply exists or not (step S102). If the output of the main power supply does not exist (step S102: No), the process control returns to step S100. By contrast, if the output of the main power supply exists (step S102: Yes), it is further judged whether an ON operation is conducted through the remote controller or not (step S104). If an ON operation is conducted through the remote controller (step S104: Yes), the drive signal producing section 12 outputs the drive signal and the relay of the switch section 13 conducts a making operation (step S106) If an ON operation is not conducted through the remote controller (step S104: No), the process control returns to step S100. If it is judged in step S100 that the timer setting is effective (step S100: Yes), the process control proceeds to step S118.

After the relay conducts a making operation in the process of step S106, it is judged in step S108 whether the timer setting is effective or not (step S108). If the timer setting is effective (step S108: Yes), it is further judged whether the time period when the timer setting is judged effective is in the timer ON period or not (step S110). If the time period is in the timer OFF period (step S110: Yes), the drive signal is output to cause the relay to conduct a breaking operation (step S112), and the process control then proceeds to step S118. By contrast, if the time period when the timer setting is judged effective is not in the timer ON period (step S110: No), the relay process is not conducted, and the process control proceeds to step S118.

If it is judged in step S108 that the timer setting is not effective (step S108: No), it is further judged whether an OFF operation is conducted through the remote controller or not (step S114). If an OFF operation is not conducted through the remote controller (step S114: No), the process control returns to step S108 to enter a state of waiting for the timer setting to become effective. By contrast, if an OFF operation is conducted through the remote controller (step S114: Yes), the drive signal is output to cause the relay to conduct a breaking operation (step S116), and the process control then returns to step S100.

In the process of step S118, it is judged whether it is a time of timer ON or not (step S118). If it is a time of timer ON (step S118: Yes), the drive signal is output to cause the relay to conduct a making operation (step S122), and the process control proceeds to step S124. By contrast, if it is not a time of timer ON (step S118: No), it is further judged whether the timer setting is cancelled or not (step S120). If the timer setting is cancelled (step S120: Yes), the process control returns to step S100. By contrast, if the timer setting is not cancelled (step S120: No), the process control returns to step S118 to enter a state of waiting for the time of timer ON.

After the relay conducts a making operation in step S122, it is judged whether it is a time of timer OFF or not (step S124). If it is a time of timer OFF (step S124: Yes), the drive signal is output to cause the relay to conduct a breaking operation (step S128), and the process control returns to step S100. By contrast, if it is not a time of timer OFF (step S124: No), it is further judged whether the timer setting is cancelled or not (step S126). If the timer setting is not cancelled (step S126: No), the process control returns to step S124 to enter a state of waiting for the time of timer OFF. By contrast, if the timer setting is cancelled (step S126: Yes), one of a process in which, after the relay breaking process (step S128), the process control returns to step S100, and that in which the process control returns to step S100 without conducting the relay breaking process is conducted. The process of step S126 relates to the state transitions which have been described with reference to FIG. 7. The process corresponding to transition N101 in FIG. 7 corresponds to that of step S126 (Yes) in FIG. 8, and that corresponding to transition N102 in FIG. 7 corresponds to that of step S126 (No) in FIG. 8.

Figure 9:
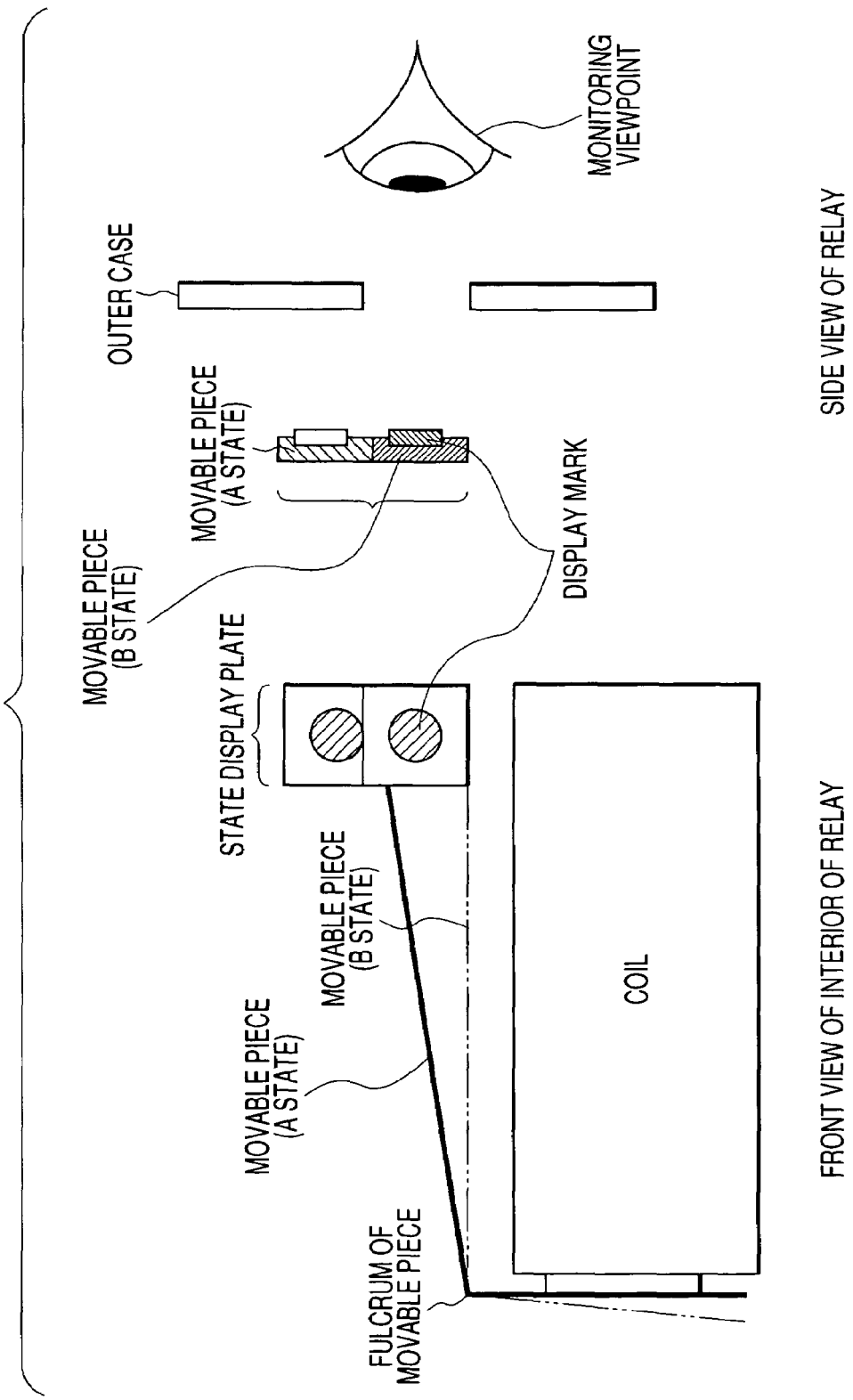
FIG. 9 is a diagram schematically showing a displaying function of a state displaying section without power 27 shown in FIG. 2.

FIG. 9 is a diagram schematically showing a displaying function of the state displaying section without power 27 shown in FIG. 2. The left portion of the figure in the sheet is a front view showing the interior of the relay in the case where the interior of the relay is viewed in a certain direction, and the right portion in the sheet is a side view of the relay in the case where the relay is viewed from the right side in the sheet with directing toward the front view of the interior of the relay. As shown in FIG. 9, a state display plate is attached to one end of a movable magnetic circuit (a movable piece in the figure) which is inside the relay, and which mechanically drives the contact. A view window through which a display mark on the state display plate is to be visually checked is formed in the outer case (chassis) of the relay.

In a self-holding relay, a current for driving the coil does not flow except in operations of opening and closing the contact, and hence it is impossible to check whether the contact state is in the break state or the make state. By contrast, in the state displaying section without power, when the contact is turned ON, the position of the movable piece is in B state so that the display mark can be seen from the monitoring view point, and, when the contact is turned OFF, the position of the movable piece is in A state so that the display mark cannot be seen from the monitoring viewpoint. Therefore, the relay state can be displayed in accordance with whether the display mark can be seen or not. As described above, the state displaying section without power which provides the self-holding relay with the above-described state displaying function can realize a function of displaying the state of the relay without consuming power.

The relationship shown in FIG. 9 between the position of the movable piece and the state of the relay contact is a mere example. In contrast to FIG. 9, when the contact is turned ON, the position of the movable piece may be in A state, and, when the contact is turned OFF, that of the movable piece may be in B state. The invention is not restricted to these manners of displaying the state. A mechanism of any type can be employed as far as it enables the state of the relay contact to be visually checked.

In the display function of the state displaying section without power 27 shown in FIG. 9, the view window is disposed in the outer case (chassis) of the relay. The invention is not restricted to this configuration. For example, a configuration may be employed in which the relay case is transparent and the state of the relay contact can be checked through a window disposed in a case of the audio apparatus. In summary, any configuration may be employed as far as the state of the relay contact can be visually checked from the outside.

As described above, the power supply control method of the embodiment is a power supply control method of controlling turn-on/turn-off of power of a main power supply to a load, by means of a control on a switch section based on an activation signal output from an activating section, the activating section comprising a timer device and a remote control receiver, wherein the method comprises: a first timer setting effectiveness judging step of judging whether timer setting is effective or not; a main power supply output judging step of, if it is judged in the first timer setting effectiveness judging step that the timer setting is not effective, judging whether an output of the main power supply exists or not; and a first remote controller operation judging step of, if it is judged in the main power supply output judging step that the output of the main power supply exists, judging whether an ON operation is conducted through the remote control receiver or not, and, when the activation signal is output based on the first remote controller operation judging step, the switch section is set to an ON state. Even in the case where both a remote controller operation and a timer operation are used, when the power supply is restored from a power failure, therefore, it is possible to realize a state expected by the user.

FIGS. 1 and 4
11 ACTIVATING SECTION
12 DRIVE SIGNAL PRODUCING SECTION
13 SWITCH SECTION
14 STANDBY POWER SUPPLY
15 MAIN POWER SUPPLY
16 LOAD
17 POWER FAILURE MONITORING SECTION
a ACTIVATION SIGNAL
b DRIVE SIGNAL
c SUPPLY OF POWER
d ENERGIZATION SIGNAL FIG. 2
15 MAIN POWER SUPPLY
16 LOAD
18 ACTIVATION APPARATUS
18a TIMER DEVICE
18b REMOTE CONTROL RECEIVER
19 RELAY DRIVING CIRCUIT
21 PRIMARY BATTERY
23 LOAD INFLUENCE ISOLATION CIRCUIT
24 SELF-HOLDING RELAY
24a RELAY CONTACT SECTION
25 POWER FAILURE MONITOR CIRCUIT
27 STATE DISPLAYING SECTION WITHOUT POWER
29 MANUAL ACTIVATING SECTION
a ACTIVATION SIGNAL
b DRIVE SIGNAL
c SUPPLY OF POWER
d ENERGIZATION SIGNAL FIG. 3
15 MAIN POWER SUPPLY
16 LOAD
16a SELF-HOLDING RELAY
16b LOAD POWER SUPPLY CIRCUIT
16d MANUAL POWER SUPPLY SWITCH
18 ACTIVATION APPARATUS
18a TIMER DEVICE
18b REMOTE CONTROL RECEIVER
19 RELAY DRIVING CIRCUIT
22 SECONDARY BATTERY
23 LOAD INFLUENCE ISOLATION CIRCUIT
25 POWER FAILURE MONITOR CIRCUIT
31 CHARGE CONTROL CIRCUIT
a ACTIVATION SIGNAL
b DRIVE SIGNAL
c SUPPLY OF POWER
d ENERGIZATION SIGNAL FIG. 5
(A) STATUS OF MAIN POWER SUPPLY
(B) REMOTE CONTROLLER INSTRUCTIONS
(C) STATE OF RELAY
(D) STATE OF LOAD POWER SUPPLY
a ENERGIZATION
b POWER FAILURE c STATES OF RELAY AND LOAD POWER SUPPLY IN RESPONSE TO REMOTE CONTROLLER OPERATION DURING POWER FAILURE FIG. 6
(A) STATUS OF MAIN POWER SUPPLY
(B) TIMER OPERATION
(C) STATE OF RELAY
(D) STATE OF LOAD POWER SUPPLY
a ENERGIZATION
b POWER FAILURE
c STATES OF RELAY AND LOAD POWER SUPPLY IN RESPONSE TO TIMER OPERATION DURING POWER FAILURE FIG. 7
RW: INITIAL STATE
RX1: RELAY OFF
RX2: RELAY ON
RY1: RELAY OFF
RY2: RELAY ON
J101 DRY BATTERY IS INSERTED
K101 TIMER SETTING IS EFFECTIVE
K102 REMOTE CONTROLLER INPUT
K103 POWER FAILURE
L101 TIMER SETTING IS EFFECTIVE
L102 REMOTE CONTROLLER INPUT DURING NOT POWER FAILURE
M101 TIMER SETTING IS CANCELLED
M102 TIMER ON
N101 TIMER SETTING IS CANCELLED
N103 TIMER OFF
a STATE TRANSITION DIAGRAM IN CASE WHERE BOTH REMOTE CONTROLLER AND TIMER DEVICE ARE USED FIG. 8
START
INITIAL STATE: TIMER IS NOT SET, POWER SUPPLY OFF
S100 TIMER SETTING IS EFFECTIVE?
S102 MAIN POWER SUPPLY EXISTS?
S104 REMOTE CONTROLLER IS ON?
S106 MAKE RELAY
S108 TIMER SETTING IS EFFECTIVE?
s110 TIMER OFF PERIOD?
S112 BREAK RELAY
S114 REMOTE CONTROLLER IS OFF?
S116 BREAK RELAY
S118 TIME OF TIMER ON?
S120 TIMER SETTING IS CANCELLED?
S122 MAKE RELAY
S124 TIME OF TIMER OFF?
S126 TIMER SETTING IS CANCELLED?
S128 BREAK RELAY FIG. 9
a FULCRUM OF MOVABLE PIECE
b COIL
c FRONT VIEW OF INTERIOR OF RELAY
d MOVABLE PIECE (A STATE)
e MOVABLE PIECE (B STATE)
f STATE DISPLAY PLATE
g DISPLAY MARK
h OUTER CASE
i MONITORING VIEWPOINT
j SIDE VIEW OF RELAY

DESCRIPTION OF REFERENCE NUMERALS AND SIGNS 11 activating section
12 drive signal producing section
13 switch section
14 standby power supply
15 main power supply
16 load
16a, 24 self-holding relay
16b load power supply circuit
16c relay contact section
16d manual power supply switch
17 power failure monitoring section
18 activation apparatus
18a timer device
18b remote control receiver
19 relay driving circuit
21 primary battery
22 secondary battery
23 load influence isolation circuit
24a relay contact section
25 power failure monitor circuit
27 state displaying section without power
29 manual activating section
31 charge control circuit

What is claimed is:

1. A power supply control apparatus, comprising:
a switch section which turns on/off of power of a main power supply to a load;
an activating section which outputs an activation signal;
a drive signal producing section which produces a drive signal which controls ON/OFF operation of the switch section, based on the activation signal;
a standby power supply which supplies operation power to the activating section and the drive signal producing section; and
a power failure monitoring section which produces an energization signal indicative of a result of monitoring of an output of the main power supply, and which outputs the energization signal to the activating section, wherein
the activating section outputs the activation signal based on the energization signal.

2. A power supply control apparatus according to claim 1, wherein
the activating section comprises a remote control receiver, a timer device, and judging means, and
the judging means produces the activation signal by using an output signal of the remote control receiver, an output signal of the timer device, and the energization signal.

3. A power supply control apparatus
a switch section which turns on/off of power of a main power supply to a load;
an activating section which outputs an activation signal;
a drive signal producing section which produces a drive signal for controlling ON/OFF operations of the switch section, based on the activation signal;
a standby power supply which supplies operation power to the activating section and the drive signal producing section; and
a power failure monitoring section which produces an energization signal indicative of a result of monitoring of an output of the main power supply, and which outputs the energization signal to the activating section, and the drive signal producing section produces the drive signal based on the energization signal.

4. A power supply control apparatus according to claim 3, wherein
the activating section comprises a timer device and a remote control receiver, and
the drive signal producing section comprises judging means for producing the activation signal with further using an output signal of the remote control receiver, and an output signal of the timer device.

5. A power supply control apparatus according to claim 1, wherein
the standby power supply is configured by a primary battery.

6. A power supply control apparatus according to claim 1, wherein
the standby power supply comprises a secondary battery and a charge control circuit which charges the secondary battery.

7. A power supply control apparatus according to claim 1, wherein
the switch section is a self-holding relay.

8. A power supply control apparatus according to claim 7, wherein
the apparatus further comprises a state displaying section without power which is used for checking whether a relay contact of the self-holding relay is in an OFF state or an ON state.

9. A power supply control apparatus according to claim 7, wherein
the apparatus further comprises a manual activating section which compulsively sets the relay contact of the self-holding relay to the ON state or the OFF state.

10. A power supply control apparatus according to claim 7, wherein
the apparatus further comprises a load influence isolation circuit which prevents an output voltage of the standby power supply from momentarily dropping when a drive current flows to a driving coil of the self-holding relay in response to the drive signal.

11. A power supply control method of controlling turn-on/turn-off of power of a main power supply to a load, by means of a control on a switch section based on an activation signal output from an activating section, the activating section comprising a timer device and a remote control receiver, the method comprising the steps of:
a first timer setting effectiveness judging step of judging whether timer setting is effective or not;
a main power supply output judging step of, if it is judged in the first timer setting effectiveness judging step that the timer setting is not effective, judging whether an output of the main power supply exists or not; and
a first remote controller operation judging step of, if it is judged in the main power supply output judging step that the output of the main power supply exists, judging whether an ON operation is conducted through the remote control receiver or not, and
when the activation signal is output based on the first remote controller operation judging step, the switch section is set to an ON state.

12. A power supply control method according to claim 11, further comprising steps of:
a second timer setting effectiveness judging step of, after the switch section is set to the ON state as a result of the output of the activation signal based on the first remote controller operation judging step, judging whether the timer setting is effective or not; and
a second remote controller operation judging step of, if it is judged in the second timer setting effectiveness judging step that the timer setting is not effective, judging whether an OFF operation is conducted through the remote control receiver or not, and
setting the switch in the OFF state when the activation signal is output based on the second remote controller operation judging step.

13. A power supply control method according to claim 12, further comprising the step of:
a timer ON period judging step of, when it is judged in the second timer setting effectiveness judging step that the timer setting is effective, judging whether a period when the timer setting is judged effective is in the timer ON period or not, and
setting the switch section to the OFF state when an activation signal is output based on the timer ON period judging step.

14. A power supply control method according to claim 13, further comprising the steps of:
setting the power supply control in at least one of the three conditions among a first condition that it is judged in the first timer setting effectiveness judging step that the timer setting is effective, a second condition that the switch section is set to the OFF state as a result of the output of the activation signal based on the timer ON period judging step, and third condition that it is judged in the timer ON period judging step that the period when the timer setting is judged effective is not in the timer ON period;
a first timer time judging step of judging whether it is a time of timer ON or not after setting the power supply control in the at least one of the three conditions;
a second timer time judging step of judging whether it is a time of timer OFF or not;
outputting the activation signal which sets the switch section to the ON state if it is judged in the first timer time judging step that it is a time of timer ON; and
outputting the activation signal which sets the switch section to the OFF state if it is judged in the second timer time judging step that it is a time of timer OFF.

* * * * *